United States Patent
Gazzo et al.

(10) Patent No.: US 12,433,290 B2
(45) Date of Patent: *Oct. 7, 2025

(54) NON-AQUEOUS DRIFT CONTROL SUSPENSIONS

(71) Applicant: Lamberti SPA, Albizzate (IT)

(72) Inventors: Serena Gazzo, Carnago (IT); Gianfranco Paganini, Conroe, TX (US); Lorenzo Giardini, Genoa (IT); Giovanni Floridi, Novara (IT); Giuseppe Li Bassi, Gavirate (IT)

(73) Assignee: LAMBERTI SPA, Albizzate (IT)

( * ) Notice: Subject to any disclaimer, the term of this patent is extended or adjusted under 35 U.S.C. 154(b) by 958 days.

This patent is subject to a terminal disclaimer.

(21) Appl. No.: 17/604,133

(22) PCT Filed: Apr. 23, 2020

(86) PCT No.: PCT/EP2020/061398
§ 371 (c)(1),
(2) Date: Oct. 15, 2021

(87) PCT Pub. No.: WO2020/216872
PCT Pub. Date: Oct. 29, 2020

(65) Prior Publication Data
US 2022/0192186 A1    Jun. 23, 2022

(30) Foreign Application Priority Data
Apr. 24, 2019  (IT) .................. 102019000006358

(51) Int. Cl.
*A01N 25/04*  (2006.01)
(52) U.S. Cl.
CPC .................... *A01N 25/04* (2013.01)
(58) Field of Classification Search
CPC ................ A01N 25/04; A01N 25/06
See application file for complete search history.

(56) References Cited

FOREIGN PATENT DOCUMENTS

| WO | 2013043678 A1 | 3/2013 | |
|---|---|---|---|
| WO | 2014040119 A1 | 3/2014 | |
| WO | 2018122122 A1 | 7/2018 | |
| WO | WO-2019209779 A1 * | 10/2019 | ............ A01N 25/04 |
| WO | 2020216872 A1 | 10/2020 | |

OTHER PUBLICATIONS

Lewis, R.W.; Evans, R.A.; Malic, N.; Saito, K.; Cameron, N.R. Polymeric Drift Control Adjuvants for Agricultural Spraying. Macromolecular Chemistry and Physics, 217, 2223-2242. (Year: 2016).*
International Search Report for PCT/EP2020/058742 dated Jun. 9, 2020.
Written Opinion of the international Search Authority for PCT/EP2020/058742 dated Jun. 9, 2020.

* cited by examiner

*Primary Examiner* — Jessica Worsham
(74) *Attorney, Agent, or Firm* — Vorys, Sater, Seymour and Pease, LLP

(57) ABSTRACT

Non-aqueous suspensions of water-soluble polymers may comprise water-soluble polymers selected among polysaccharides, derivatives of polysaccharides, and mixtures thereof and may further comprise a carrier fluid, an emulsifier, and a suspending agent. The suspending agent may be obtained by polymerization of: (I) from 20 to 70% by weight of a monoethylenically unsaturated monomer containing a carboxylic group; (II) from 20 to 70% by weight of a (meth)acrylic acid ester; (III) from 0 to 3% by weight of a polyethylenically unsaturated monomer; and (IV) from 0 to 10% by weight of a nonionic acrylic associative monomer. The sum of I and II may represent at least 80% by weight of the monomer mixture.

8 Claims, No Drawings

NON-AQUEOUS DRIFT CONTROL SUSPENSIONS

The present invention relates to non-aqueous suspensions with improved drift control properties comprising a carrier liquid, a polymeric drift control agent, emulsifier and a specific suspending agent, and to a method of making and to a method of using such non-aqueous suspensions.

BACKGROUND OF THE INVENTION

In agriculture, formulations of active compounds are often sprayed, normally after dilution in an aqueous liquid, onto plants and/or their habitat. When applying such formulations, a more or less pronounced drifting of the spray solution containing the active substances may be observed.

Spray drift is sprayed material that misses the target during application; it represents a restriction factor, which reduces the efficiency of pesticidal treatments, consequently increasing the costs of the treatments. Spray drift also increases the impact of chemicals on the environment and can adversely affect non-target plants, pollute adjacent watercourses, groundwater, landscapes, and woodland. Spray drift can bring the applicator and members of the public into increased contact with potentially harmful or unpleasant chemicals.

Spray drift is caused by a combination of factors such as wind speed, local atmospheric conditions, nozzle choice, sprayer pressure, vehicle speed, boom height and chemical factors.

Until now, research has principally focused on reducing spray drift by altering the sprayer features, such as nozzles and operating pressure and by using special adjuvants, known as drift control agents, to optimize droplet size distribution basically reducing the smallest droplets and limiting the increasing of coarser ones.

The drift control agents (or anti-drift agents) change the viscoelastic properties of the sprayed liquid, more specifically its elongational viscosity, and its tendency to separate into smaller droplets. These factors result in a spray with a reduced percentage of smaller droplets, i.e. those having a diameter below 150 microns.

One of the most commonly used drift control agents is represented by guar gum or its derivatives, which were traditionally added as solid additives to aqueous agricultural spray formulations right before application (in tank or tank mixing). However, the hydration of powdery or granulated, water-soluble polymers such as guar gum or its derivatives in aqueous mediums can often be an arduous and frustrating task. Insufficient dispersion of powdered guar gum, caused most often by the too rapid addition of the powder to the aqueous medium or insufficient stirring of the medium, often results in agglomeration or lumps. The formation of lumps can result in difficulty in spraying and in loss of drift control, caused by the lowering of the overall concentration of dissolved guar gum in the spray medium. In addition, the aqueous medium may not be readily pumpable, and risk of plugging the spray nozzle holes exists.

In order to overcome the disadvantages associated with the use of powdery guar based drift control compositions, the use of concentrated liquid water- or oil-based guar containing drift control compositions represents a promising solution, which is partially already practiced In the field.

In the prior art, U.S. Pat. No. 6,939,555, as an example, discloses a homogenous agricultural composition containing at least one fertilizer or oil and at least one natural gum as deposition agent. Compositions similar to those described in U.S. Pat. No. 6,939,555, however, show propensity to settle on standing, as reported by Halecky, A., Roberts, J., Penfield, K., and Baker, T., "Evaluation of a Modified Guar OD Formulation for Spray Drift Mitigation," Journal of ASTM International, Vol. 8, No. 10, 2011, pp. 1-13.

AU 2013206347 discloses an oil-based liquid concentrate comprising: a) about 0.01 to about 15% w/w of an agent that modifies the viscosity of a sprayable liquid (i.e, a drift control agent); b) 56 to about 75% w/w of an oil selected from vegetable, paraffin, mineral and synthetic oils or mixtures thereof; and c) about 1 to about 5% w/w of a dispersing agent.

US 2011/0054042 discloses a non-aqueous guar composition containing polyethylene glycol, a vegetable oil, an emulsifier and clay as the suspending agent.

Notwithstanding, a need still exists in the art to provide non-aqueous compositions containing guar or guar derivatives or other polymeric drift control agents, which are stable, give desirable drift reduction and, possibly, can convey to the final agrochemical compositions other additives, such as conditioning agents, emulsifiers and adjuvants.

SUMMARY OF THE INVENTION

It is therefore an object of the present invention a non-aqueous suspension comprising:
  a) from 20 to 90 wt % (% by weight) of a carrier fluid selected from the group consisting of glycols, polyglycols, glycol ethers, glycol esters, lactate esters, or mixtures thereof;
  b) from 2 to 60 wt % of a water-soluble polymer dispersed in said carrier fluid, wherein said water-soluble polymer is selected among polysaccharides, derivatives of polysaccharides, and mixtures thereof;
  c) from 0.5 to 15 wt % of a suspending agent, wherein said suspending agent is a copolymer of a monoethylenically unsaturated monomer containing a carboxylic group and a (meth)acrylic acid ester;
  d) from 1 to 20 wt % of an emulsifier.

A further object of the invention is a method for reducing spray drift during spray application of a pesticidal or crop protection formulation, which comprises tank mixing the formulation with a non-aqueous suspension comprising:
  a) from 20 to 90 wt % (% by weight) of a carrier fluid selected from the group consisting of glycols, polyglycols, glycol ethers, glycol esters, lactate esters or mixtures thereof;
  b) from 2 to 60 wt % of a water-soluble polymer dispersed in said carrier fluid, wherein said water-soluble polymer is selected among polysaccharides, derivatives of polysaccharides and mixtures thereof;
  c) from 0.5 to 15 wt % of a suspending agent, wherein said suspending agent is a copolymer of a monoethylenically unsaturated monomer containing a carboxylic group and a (meth)acrylic acid ester;
  d) from 1 to 20 wt % of an emulsifier,
and spraying the mixed formulation on the field.

According to another embodiment, the invention is a method of preparing a non-aqueous suspension comprising the following steps:
  i. providing from 20 to 90 wt % of a carrier fluid selected from the group consisting of glycols, polyglycols, glycol ethers, glycol esters, lactate esters or mixtures thereof;
  ii. providing from 2 to 60 wt % of a water-soluble polymer which is selected among polysaccharides, derivatives of polysaccharides and mixtures thereof;

iii. providing from 1 to 20 wt % of an emulsifier;
iv. mixing said carrier fluid, water-soluble polymer and emulsifier, in any order and regulate, if necessary, the pH of the resulting mixture, measured at 1 wt % in water, to from 3 to 6 by addition of an acid;
v. adding to the obtained mixture from 0.5 to 15 wt % of a suspending agent, wherein said suspending agent is a copolymer of a monoethylenically unsaturated monomer containing a carboxylic group and a (meth)acrylic acid ester.

DETAILED DESCRIPTION OF THE INVENTION

Preferably, said non-aqueous suspension comprises:
a) from 50 to 80 wt % of a carrier fluid selected from the group consisting of glycols, polyglycols, glycol ethers, glycol esters, lactate esters or mixtures thereof;
b) from 5 to 20 wt % of a water-soluble polymer dispersed in said carrier fluid, wherein said water-soluble polymer is selected among polysaccharides or derivatives thereof;
c) from 1 to 10 wt % of a suspending agent, which is a copolymer of a monoethylenically unsaturated monomer containing a carboxylic group and a (meth)acrylic acid ester;
d) from 3 to 20 wt % of an emulsifier Although non-aqueous suspensions comprising various suspending agents have been described in the literature, it has surprisingly been found that also copolymers of a monoethylenically unsaturated monomer containing a carboxylic group and a (meth)acrylic acid ester can be successfully used to provide stable and easily pourable non-aqueous suspensions of a water-soluble polymer. This result is particularly surprising, because such copolymers, which are usually obtained through an emulsion polymerization process, have been developed and are extensively used as thickening agents and/or suspending agents in aqueous systems (e.g., in cosmetics or detergency), wherein their thickening effect is driven by the electrostatic repulsion between the carboxylate groups generated in an aqueous alkaline medium.

The suspensions according to the invention are non-aqueous. As referred to herein, "non-aqueous" means a liquid which is substantially free of water or which contains a minor amount of water. The minor amount of water in the suspension medium can be ascribed to different sources: the moisture content of the water-soluble polymer, residual content of water, which can be present in the non-aqueous carrier fluid after a distillation process, water content of the copolymer, which can be provided in the form of an emulsion. Said minor amount of water is typically less than 10% by weight (wt %), preferably less than 7 wt % of the suspension.

The carrier fluids of the invention are non-aqueous and are miscible with water. Suitable carrier fluids are selected from the group consisting of glycols, polyglycols, glycol ethers, glycol esters, lactate esters or mixtures thereof. Preferably, said non-aqueous carrier fluids are glycol ethers.

The glycols or polyglycols suitable for use as the carrier fluid of the invention should have a molecular weight greater than 100 Da; compounds having molecular weights below 100 Da tend to undesirably solvate the suspended particles. However, due to the requirement that the carrier fluid is in the liquid phase at ambient temperatures, their molecular weight should be less than 4,000 Da. Therefore, suitable glycols and polyglycols can have a molecular weight in the range of from 100 to 4,000 Da, preferably from 100 to 2,000 Da, and more preferably, from about 100 to 1,000 Da., even more preferably from 200 to 500 Da (the molecular weights of the hydroxylated carriers are calculated based on the hydroxyl number, which can be determined according to standard methods ASTM E222-10 or E1899-16). The glycols that can be used as carrier fluid have the following general formula:

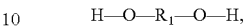
$$H\text{—}O\text{—}R_1\text{—}O\text{—}H,$$

where $R_1$ is an alkylene group having from 4 to 8 carbon atoms. Examples of suitable glycols include, 1,5-pentanediol and hexylene glycol.

The polyglycols that can be used as the carrier fluid have the following formula:

$$H\text{—}[O\text{—}R_1]_n\text{—}O\text{—}H,$$

where $R_1$ is an alkylene group having from 1 to 6 carbon atoms, preferably, from 2 to 4 carbon atoms. The value for n is an integer in the range of from 1 to 100. Specific examples of polyglycols that can suitably be used include, but are not limited to, triethylene glycol, dipropylene glycol, tripropylene glycol, polyethylene glycol (having a molecular weight between 200 to 4,000 Da, preferably from 200 to 1,000 Da, more preferably from 200 to 500 Da), and polypropylene glycol (having a molecular weight between 200 to 4,000 Da, preferably from 200 to 1,000 Da). The preferred polyglycols for use as the carrier fluid are polyethylene glycol, and triethylene glycol.

The glycol ethers that can be used as the carrier fluid have the following general formula:

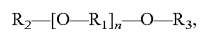
$$R_2\text{—}[O\text{—}R_1]_n\text{—}O\text{—}R_3,$$

where $R_1$ is an alkylene group having from 1 to 6 carbon atoms, preferably, from 2 to 4 carbon atoms, and where each $R_2$ and $R_3$ can be a hydrogen, an alkyl, aryl, aralkyl or alkylaryl group having from 1 to 10 carbon atoms, provided that they are not both a hydrogen. The value for n is an integer in the range of from 1 to 10. Specific examples of glycol ethers which can suitably be used as the carrier fluid include, but are not limited to, ethylene glycol butyl ether, diethylene glycol dimethyl ether, diethylene glycol ethyl ether, diethylene glycol butyl ether (butyl diglycol), diethylene glycol phenyl ether, triethylene glycol butyl ether, dipropylene glycol methyl ether and dipropylene glycol dimethyl ether. The preferred glycol ethers for use as the carrier fluids of the suspensions are monoalkyl glycol ethers and in particular dipropylene glycol methyl ether and diethylene glycol butyl ether, diethylene glycol butyl ether being most preferred.

The glycol esters that can be used as the carrier fluid have the following general formula:

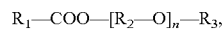
$$R_1\text{—}COO\text{—}[R_2\text{—}O]_n\text{—}R_3,$$

where $R_1$ is an alkyl group having from 1 to 6 carbon atoms, preferably from 1 to 4 carbon atoms, and where $R_2$ is an alkyl group having from 1 to 6 carbon atoms, preferably from 1 to 4 carbon atoms, and where $R_3$ is either a hydrogen, alkyl or $OOCR_4$, where Ra has the same meaning of $R_1$. The value for n is an integer in the range of from 1 to 10. Specific examples of glycol ester compounds that can suitably be used as the carrier fluid include, but are not limited to, 1,2-ethanediol monoacetate and ethylene glycol diacetate.

Other examples of glycol ester compounds that can suitably be used as the carrier fluid include, but are not limited to, 2-ethoxy ethyl acetate, diethylene glycol ethyl ether acetate, diethylene glycol butyl ether acetate and dipropylene glycol methyl ether acetate.

Suitable lactate esters that can be used as the carrier fluid include, but are not limited to, ethyl lactate, methyl lactate, butyl lactate and combinations of any thereof.

According to the invention, the most preferred carrier fluids are glycol ethers, and in particular ethylene glycol butyl ether, diethylene glycol butyl ether, triethylene glycol butyl ether and dipropylene glycol methyl ether, diethylene glycol butyl ether being the most preferred carrier fluid.

Stable liquid non-aqueous suspensions according to the invention are those in which the water-soluble polymer remains dispersed in the liquid phase and does not settle out from the liquid phase after storage for 14 days at 54° C. or those suspensions which settle out, but show a separation of liquid phase on the top of the suspension which is less than 5% by volume after storage for 14 days at 54° C.

According to the invention, the water-soluble polymer is in the form of solid particulates that are substantially insoluble, or only partially soluble, in the non-aqueous carrier fluid. The average diameter of the polymer particles is in the range from about 0.1 to about 1000 microns, preferably from about 0.5 to about 500 microns, more preferably from about 1 to about 100 microns.

According to the invention, suitable water-soluble polymers include various polysaccharides or derivatives thereof.

"Polysaccharide" as used herein means a polymer comprising a plurality of monosaccharides (sugar units), typically pentose and/or hexose sugar units. Non-limiting examples of suitable polysaccharides include starches, celluloses, hemicelluloses, xylans, chitin, polygalactomannans, polyarabinans, polygalactans, xyloglucans and mixtures thereof. The term "polysaccharide" is also meant to include polymers with heteroatoms present in the polysaccharide structure, such as chitin and/or chitosan, or polymers that comprise different types of sugar units (heteropolysaccharide), for example, polymers that comprise pentose sugar units and hexose sugar units.

"Polysaccharide derivatives" refers to polysaccharides modified by chemical reactions resulting in chemical groups covalently bonded to the polysaccharide, e.g., methyl, ethyl, carboxymethyl, hydroxyethyl, hydroxypropyl, cationic, hydrophobic alkyl chains, and the like.

These polysaccharides and derivatives thereof are known in the art and either are commercially available or can be manufactured using methods well known per se in the art.

Suitable, non-limitative examples of polysaccharides include polygalactomannans, xanthans, chitosan, xyloglucans, pectin, alginate, agar, dextrin, starch, amylose, amylopectin, alternan, gellan, mutan, dextran, pullulan, fructan, gum arabic and carrageenan.

Examples of suitable polygalactomannans are guar gum, locust bean gum, tara gum, cassia gum and sesbania gum. A suitable example of xyloglucan is tamarind gum.

Among the polysaccharide derivatives, examples of cellulose derivatives are hydroxyethyl cellulose, ethyl hydroxyethyl cellulose, carboxymethyl cellulose, carboxymethyl hydroxyethyl cellulose, methyl cellulose, ethylcellulose, methyl hydroxypropyl cellulose, carboxymethylmethyl cellulose, hydrophobically modified carboxymethylcellulose, hydrophobically modified hydroxyethyl cellulose, hydrophobically modified hydroxypropyl cellulose, hydrophobically modified methyl cellulose.

Guar derivatives that are useful in this preferred embodiment include carboxymethyl guar, hydroxyethyl guar, hydroxypropyl guar, carboxymethylhydroxypropyl guar, cationic guar, cationic hydroxypropyl guar, hydrophobically modified guar, hydrophobically modified carboxymethyl guar, hydrophobically modified hydroxyethyl guar, hydrophobically modified hydroxypropyl guar, cationic hydrophobically modified hydroxypropyl guar, hydrophobically modified carboxymethylhydroxypropyl guar, hydrophobically modified cationic guar.

Examples of starch derivatives include carboxymethyl starch and hydroxypropyl starch.

Other polysaccharides may be similarly derivatized.

The polysaccharides or derivatives thereof of the invention can be crosslinked, by using, for example Borax (sodium tetraborate) or glyoxal. According to an embodiment of the invention, the derivatized polysaccharides have a degree of substitution (DS) in the range of 0.01-3.0 or a molar substitution (MS) comprised between 0.01 and 4.0.

The expression "degree of substitution" (DS) refers to the average number of sites that are substituted with a functional group (e.g., carboxymethyl) per anhydroglycosidic unit in the polysaccharide. Usually each of the anhydroglycosidic units of a polysaccharide contains on the average three available hydroxyl sites. A degree of substitution of three would mean that all of the available hydroxyl sites have been substituted with functional groups.

With the expression "molar substitution" (MS), we mean the number of substituents (e.g., hydroxypropyl) on each anhydroglycosidic unit of the polysaccharide.

According to a preferred embodiment of the invention, the water-soluble polymers is guar or a derivative thereof.

Guar (or guar gum) is a polysaccharide belonging to the family of polygalactomannans and is extracted from a leguminosae, "Cyamopsis Tetragonolobus", that grows in the semi-dry region of tropical countries, particularly in India and in Pakistan, and has D-mannosyl to D-galactosyl unit ratio of about 2:1.

Guar gum typically has a weight average molecular weight of between 2,000,000 and 5,000,000 Da.

The water soluble polymer is more preferably guar gum or hydroxypropyl guar, and most preferably guar gum.

The suspending agent according to the invention is used not only to provide additional viscosity to the carrier fluid but also to assist in keeping the non-soluble particulate material dispersed in the carrier fluid. The suspending agent according to the invention must be soluble in the carrier fluid of the inventive composition and at the same time be able to enhance the suspensibility of the water-soluble polymer within the liquid phase of the composition and, thus, the stability of the inventive composition. It has been found that stable non-aqueous suspensions can be obtained by using as suspending agent a copolymer of a monoethylenically unsaturated monomer containing a carboxylic group and a (meth)acrylic acid ester. Preferably, said copolymer is obtained by polymerization of:

I. from 20 to 70% by weight, preferably from 20 to 50% by weight of a monoethylenically unsaturated monomer containing a carboxylic group;

II. from 20 to 70% by weight, preferably from 40 to 70% by weight, of a (meth)acrylic acid ester;

III. from 0 to 3% by weight, preferably from 0.01 to 1% by weight, of a polyethylenically unsaturated monomer;

IV. from 0 to 10% by weight, preferably from 0 to 3% by weight of a nonionic acrylic associative monomer, wherein the sum of I. and II. represents at least the 80% by weight of the monomer mixture.

Said copolymer can be prepared according to known polymerization methods such as emulsion, solution, bulk or precipitation polymerization, but preferably it is prepared by emulsion polymerization.

The monoethylenically unsaturated monomer containing a carboxylic group useful for the preparation of the copolymer of the present disclosure can be selected among ethylenically unsaturated mono- or di-carboxylic acids or salts thereof or anhydrides thereof, such as acrylic acid, methacrylic acid, itaconic acid, crotonic acid, maleic acid and fumaric acid. Methacrylic acid is the preferred monoethylenically unsaturated monomer containing a carboxylic group.

The (meth)acrylic acid ester b) is selected among $C_1$-$C_8$ (meth)acrylic acid alkyl esters, such as methyl, ethyl, propyl, butyl, 2-ethylhexyl(meth)acrylates or mixtures thereof. Preferably the (meth)acrylic acid ester b) is ethyl acrylate.

The polyethylenically unsaturated monomer c) can be any of the known polyfunctional derivatives that are known to undergo radical polymerization with (meth)acrylic monomers. Among the useful polyethylenically unsaturated monomers there are trimethylolpropane triacrylate, diallyl maleate, allyl methacrylate, diallyl phthalate, N-methylene-bis-acrylamide, pentaerythritol ether polyacrylates and triallyl cianurate.

The nonionic acrylic associative monomer d) may be selected among (meth)acrylic acid esters of $C_8$-$C_{30}$ alkyl, alkylaryl or polycyclic hydrocarbyl monoether of a polyethylene glycol having at least two oxyethylene units, preferably having 10 to 40 oxyethylene units, and having up to 70 oxyethylene units, these esters having general formula

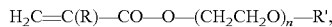

$H_2C=C(R)-CO-O-(CH_2CH_2O)_n-R'$, wherein

R is H or $CH_3$, the latter being preferred;

n is at least 2, and preferably has an average value of at least 10, up to 40 to 60 or even up to 70;

and R' is a hydrophobic group, for example an alkyl, alkylaryl, or polycyclic alkyl group having 8 to 30 carbon atoms, preferably having an average of 12 to 18 carbon atoms.

Other unsaturated monomers may be used in the polymerization beside the monomers I. to IV., such as, by way of example, other nonionic acrylic monomers, monoethylenically unsaturated monomers possibly containing a sulfonic acid group, cationic acrylic monomers. Non limiting examples of other utilizable unsaturated monomers are vinyl acetate, styrene, vinyl chloride, vinylidene chloride, acrylonitrile, (meth)acrylamide, N,N-dimethyl(meth)acrylamide, t-butyl(meth)acrylamide, sodium vinyl sulfonate, 2-acrylamido-2-methylpropane sulfonic acid.

The copolymer of the invention has a Brookfield® viscosity in water at pH 7.5 (spindle 6, RVT, 20 rpm, 1.0% by weight and 20° C.) comprised between about 500 and about 10,000 mPa*s.

Surprisingly, the copolymer of the invention shows its optimal suspending effect if it is completely undissociated (i.e., when the carboxyl groups are protonated). For this reason, if the water-soluble polymer to be suspended has a residual basicity, or some other component brings basicity to the composition, it can be necessary to add an acid before adding the suspending agent to the composition, to regulate its pH, measured at 1 wt % in water, at 3-6, preferably at 4-5.

Optionally, the suspensions of the invention can contain from 0 to 2.0 wt % of additional suspending agents selected from silica, fumed silica, colloidal or colloid-forming clays such as smecticte clays or attapulgite clays.

Suitable smectite clays (also known as montmorillonoid clays) include, for example, montmorillonite (bentonite), volchonskoite, nontronite, beidellite, hectorite, saponite, sauconite and vermiculite.

Attapulgite clays (also known as palygorskite clays) are magnesium-rich clays and suitable examples thereof are those commercially available from BASF under the tradename Attagel®.

The emulsifier in the non-aqueous liquid suspension of the invention is typically an anionic, non-ionic, cationic, ampholytic surfactant or a mixture thereof.

Suitable emulsifiers are, for example, non-ionic surfactants, such as: polyalkoxylated, preferably polyethoxylated, saturated and unsaturated aliphatic alcohols, having 8 to 24 carbon atoms in the alkyl radical, which is derived from the corresponding fatty acids or from petrochemical products, and having 1 to 100, preferably 4 to 40, ethylene oxide units (EO); polyalkoxylated, preferably polyethoxylated, arylalkylphenols, such as, for example, tristyrylphenol having an average degree of ethoxylation of between 8 and 80, preferably from 16 to 40; polyalkoxylated, preferably polyethoxylated, alkylphenols having one or more alkyl radicals, such as, for example, nonylphenol or tri-sec-butylphenol, and a degree of ethoxylation of between 2 and 40, preferably from 4 to 20; polyalkoxylated, preferably polyethoxylated, hydroxy-fatty acids or glycerides of hydroxy-fatty acids, such as, for example, castor oil, having a degree of ethoxylation of between 10 and 80; sorbitan or sorbitol esters with fatty acids or polyalkoxylated, preferably polyethoxylated, sorbitan or sorbitol esters; polyalkoxylated, preferably polyethoxylated, fatty amines; di- and tri-block copolymers, for example from alkylene oxides, for example from ethylene oxide and propylene oxide, having average molar masses between 200 and 8000 g/mol, preferably from 1000 to 4000 g/mol; alkylpolyglycosides or polyalkoxylated, preferably polyethoxylated, al kylpolyglycosides.

Preferred non-ionic emulsifiers are polyethoxylated alcohols, preferably from renewable resources, such as 4-8 moles ethoxylated (4-8 EO) $C_{12}$-$C_{14}$ natural alcohol; polyethoxylated glycerides of hydroxy-fatty acids, polyethoxylated fatty amines, typically polyethoxylated $C_{12}$-$C_{22}$ primary amines, and polyethylene oxide/polypropylene oxide block copolymers. Also suitable as emulsifiers (and wetting agents) are anionic surfactants, for example: polyalkoxylated, preferably polyethoxylated, surfactants which are ionically modified, for example by conversion of the terminal free hydroxyl function of the alkylene oxide block into a sulfate or phosphate ester; alkali metal and alkaline earth metal salts of alkylarylsulfonic acids having a straight-chain or branched alkyl chain; alkali metal and alkaline earth metal salts of paraffin-sulfonic acids and chlorinated paraffin-sulfonic acids; polyelectrolytes, such as lignosulfonates, condensates of naphthalenesulfonate and formaldehyde, polystyrenesulfonate or sulfonated unsaturated or aromatic polymers; anionic esters of alkylpolyglycosides, such as those described in WO 2010/100039, for example alkylpolyglucoside sulfosuccinate or citrate; sulfosuccinates which are esterified once or twice with linear or branched aliphatic, cycloaliphatic and/or aromatic alcohols, or sulfosuccinates which are esterified once or twice with polyalkyleneoxide adducts of alcohols.

Preferred anionic surfactants are $C_4$-$C_{14}$ dialkyl sulfosuccinates, in particular dioctyl sulfosuccinate.

Examples of cationic and ampholytic emulsifiers are quaternary ammonium salts, alkyl amino acids, and betaine or imidazoline amphotensides.

Preferably, the emulsifier is a mixture of non-ionic and anionic surfactants, more preferably a mixture of at least one non-ionic surfactant selected among polyethoxylated alcohols, preferably from renewable resources, such as (4-8 EO) $C_{12}$-$C_{14}$ natural alcohol, polyethoxylated glycerides of hydroxy-fatty acids, polyethoxylated fatty amines, typically polyethoxylated $C_{12}$-$C_{22}$ monoalkyl amines, and polyethylene oxide/polypropylene oxide block copolymers with at least one $C_4$-$C_{14}$ dialkyl sulfosuccinate.

The most preferred emulsifier is a mixture of (4-8 EO) $C_{12}$-$C_{14}$ alcohol and dioctyl sulfosuccinate.

The invention further relates to a method for reducing spray drift during spray application of a pesticidal or crop protection tank formulation which comprises tank mixing the formulation with the above described non aqueous drift control composition.

When the formulation to be sprayed is a crop protection formulation, in some embodiments it is desirably a fertilizing formulation containing as the active substance, by way of example: ammonia salts, such as ammonium sulfate, ammonium bisulfate, ammonium salts of carboxylic acids, ammonium chloride, ammonium carbonate, ammonium phosphate; urea and urea derivatives; phosphate sources, such as phosphoric acid and salts thereof; potash sources, like potassium phosphate (mono- or di-), potassium carbonate, potassium citrate, potassium nitrate; compounds containing micronutrients and secondary nutrients like zinc, manganese, magnesium, iron, calcium, sulfur, boron, etc.; and mixture thereof.

When the formulation is a pesticidal formulation, in some embodiments it is desirably an herbicidal formulation, containing a herbicide as the active substance. Said herbicides include: Acetochlor, Acibenzolar, Acibenzolar-S-methyl, Acifluorfen, Acifluorfen-sodium, Aclonifen, Alachlor, Allidochlor, Alloxydinn, Alloxydinn-sodium, Ametryn, Amicarbazone, Amidochlor, Amidosulfuron, Aminocyclopyrachlor, Aminopyralid, Amitrole, Ammonium sulfamat, Ancymidol, Anilofos, Asulam, Atrazine, Azafenidin, Azimsulfuron, Aziprotryn, Beflubutamid, Benazolin, Benazolin-ethyl, Bencarbazone, Benfluralin, Benfuresate, Bensulide, Bensulfuron, Bensulfuron-methyl, Bentazone, Benzfendizone, Benzobicyclon, Benzofenap, Benzofluor, Benzoylprop, Bicyclopyrone, Bifenox, Bispyribac, Bispyribac-sodium, Bromacil, Bromobutide, Bromofenoxim, Bromoxynil, Bromuron, Buminafos, Busoxinone, Butachlor, Butafenacil, Butamifos, Butenachlor, Butralin, Butroxydim, Butylate, Cafenstrole, Carbetamide, Carfentrazone, Carfentrazone-ethyl, Chlomethoxyfen, Chloramben, Chlorazifop, Chlorazifop-butyl, Chlorbromuron, Chlorbufam, Chlorfenac, Chlorfenac-sodium, Chlorfenprop, Chlorflurenol, Chlorflurenol-methyl, Chloridazon, Chlorimuron, Chlorimuron-ethyl, Chlormequat-chloride, Chlornitrofen, Chlorophthalim, Chlorthal-dimethyl, Chlorotoluron, Chlorsulfuron, Cinidon, Cinidon-ethyl, Cinmethylin, Cinosulfuron, Clethodim (C10), Clodinafop, Clodinafop-propargyl, Clofencet, Clomazone, Clomeprop, Cloprop, Clopyralid (C1), Cloransulam, Cloransulam-methyl, Cumyluron, Cyanamide, Cyanazine, Cyclanilide, Cycloate, Cyclosulfamuron, Cycloxydim (C11), Cycluron, Cyhalofop, Cyhalofop-butyl, Cyperquat, Cyprazine, Cyprazole, 2,4-D (and salts or esters thereof such as 2,4-D-butotyl, 2,4-D-butyl, 2,4-D-dimethylammonium, 2,4-D-diolamine, 2,4-D-ethyl, 2,4-D-ethylhexyl, 2,4-D-isobutyl, 2,4-D-isoctyl, 2,4-D-isopropyl, 2,4-D-isopropylammonium, 2,4-D-sodium, 2,4-D-triisopropanolammonium, 2,4-D-trolamine), 2,4-DB, Dalapon, Daminozide, Dazomet, n-Decanol, Desmedipham, Desmetryn, Detosyl-Pyrazolate (DTP), Diallate, Dicamba (and salts or esters thereof such as Dicamba-butotyl, Dicamba diglycolamine salt, Dicamba-dimethylammonium, Dicamba-diolamine, Dicamba-isopropylammonium, Dicamba-potassium, Dicamba-sodium, Dicamba-trolamine), Dichlobenil, Dichlorprop, Dichlorprop-P, Diclofop, Diclofop-methyl, Diclofop-P-methyl, Diclosulam, Diethatyl, Diethatyl-ethyl, Difenoxuron, Difenzoquat, Diflufenican, Diflufenzopyr, Diflufenzopyr-sodium, Dimefuron, Dikegulac-sodium, Dimefuron, Dimepiperate, Dimethachlor (C2), Dimethametryn, Dimethenamid, Dimethenamid-P, Dimethipin, Dimetrasulfuron, Dinitramine, Dinoseb, Dinoterb, Diphenamid, Dipropetryn, Diquat, Diquat-dibromide, Dithiopyr, Diuron, DNOC, Eglinazine-ethyl, Endothal, EPTC, Esprocarb, Ethalfluralin, Ethametsulfuron, Ethametsulfuron-methyl, Ethephon, Ethidimuron, Ethiozin, Ethofumesate, Ethoxyfen, Ethoxyfen-ethyl, Ethoxysulfuron, Etobenzanid, F-5331, i.e. N-[2-Chloro-4-fluoro-5-[4-(3-fluoropropyl)-4,5-dihydro-5-oxo-1H-tetrazol-1-yl]-phenyl]-ethan sulfonamide, F-7967, i.e. 3-[7-Chloro-5-fluoro-2-(trifluoromethyl)-1H-benzimidazol-4-yl]-1-methyl-6-(trifluormethyl)pyrimidin-2,4 (1H,3H)-dione, Fenoprop, Fenoxaprop, Fenoxaprop-P, Fenoxaprop-ethyl, Fenoxaprop-P-ethyl (C3), Fenoxasulfone, Fentrazamide, Fenuron, Flamprop, Flamprop-M-isopropyl, Flamprop-M-methyl, Flazasulfuron, Florasulam, Fluazifop, Fluazifop-P, Fluazifop-butyl, Fluazifop-P-butyl, Fluazolate, Flucarbazone, Flucarbazone-sodium, Flucetosulfuron, Fluchloralin, Flufenacet (Thiafluamide), Flufenpyr, Flufenpyr-ethyl, Flumetralin, Flumetsulam, Flumiclorac, Flumiclorac-pentyl, Flumioxazin, Flumipropyn, Fluometuron, Fluorodifen, Fluoroglycofen, Fluoroglycofen-ethyl, Flupoxam, Flupropacil, Flupropanate, Flupyrsulfuron, Flupyrsulfuron-methyl-sodium, Flurenol, Flurenol-butyl, Fluridone, Flurochloridone, Fluroxypyr, Fluroxypyr-meptyl, Flurprimidol, Flurtamone, Fluthiacet, Fluthiacet-methyl, Fluthiamide, Fomesafen, Foramsulfuron, Forchlorfenuron, Fosamine, Furyloxyfen, Glufosinate, Glufosinate ammonium, Glyphosate, Glyphosate-diammonium, Glyphosate-isopropylammonium, Glyphosate-potassium, H-9201, i.e. O-(2,4-Dimethyl-6-nitrophenyl)-O-ethyl-isopropyl phosphoramidothioate, Halosafen, Halosulfuron, Halosulfuron-methyl, Haloxyfop, Haloxyfop-p (C4), Haloxyfop-ethoxyethyl, Haloxyfop-P-ethoxyethyl, Haloxyfop-methyl, Haloxyfop-P-methyl, Hexazinone, HW-02, i.e. 1-(Dimethoxyphosphoryl)-ethyl(2,4-dichlorophenoxy)acetate, lmazamethabenz, lmazamethabenz-methyl, Imazamox (C9), Imazamox-ammonium, Imazapic, Imazapyr, Imazapyr-isopropylammonium, Imazaquin, Imazaquin-ammonium, Imazethapyr, Imazethapyr-ammonium, Imazosulfuron, Inabenfide, Indanofan, Indaziflam, Indolacetic acid (IAA), 4-Indol-3-yl-butirric acid (IBA), lodosulfuron, lodosulfuron-methyl-sodium, Ioxynil, Ipfencarbazone, Isocarbamid, Isopropalin, Isoproturon, Isouron, Isoxaben, Isoxachlortole, Isoxaflutole, Isoxapyrifop, KUH-043, i.e. 3-({[5-(Difluoromethyl)-1-methyl-3-(trifluoromethyl)-1H-pyrazol-4-yl]methyl}sulfonyl)-5,5-dimethyl-4,5-dihydro-1,2-oxazole, Karbutilate, Ketospiradox, Lactofen, Lenacil, Linuron, MCPA, MCPB, MCPB-methyl, -ethyl and -sodium, Mecoprop, Mecoprop-sodium, Mecoprop-butotyl, Mecoprop-P-butotyl, Mecoprop-P-dimethylammoniunn, Mecoprop-P-2-ethylhexyl, Mecoprop-P-potassium, Mefenacet, Mefluidide, Mepiquat-chlorid, Mesosulfuron, Mesosulfuron-methyl, Mesosulfuron-methyl-Na, Mesotrione, Methabenzthiazuron, Metam, Metamifop, Metamitron, Metazachlor (C5), Metazasulfuron, Methazole, Methiopyrsulfuron, Methiozolin, Methoxyphenone, Methyldymron, 1-Methylcyclopropen, Methylisothiocyanat, Metobenzuron, Metobromuron, Metolachlor, S-Metolachlor, Metosulam, Metoxuron, Metribuzin, Metsulfuron, Metsulfuron-methyl, Molinate, Monalide, Monocarbamide, Monocarbamide-dihydrogensulfat, Monolinuron, Monosulfuron, Monosulfuron-ester, Monuron, MT-128, i.e. 6-Chloro-N-[(2E)-3-chloroprop-2-en-1-yl]-5-methyl-N-phenylpyridazin-3-amine, MT-5950, i.e. N-[3-Chloro-4-(1-methylethyl)-phenyl]-2-methylpentanamide, NGGC-011, Naproanilide, Napropamide (C6), Naptalam, NC-310, i.e. 4-(2,4-Dichlorobenzoyl)-1-methyl-5-benzyloxypyrazole, Neburon, Nicosulfuron, Nipyraclofen, Nitralin, Nitrofen, Nitrophenolat-sodium (isomer mixture), Nitrofluorfen, Nonansäure, Norflurazon, Orbencarb, Orthosulfamuron, Oryzalin, Oxadiargyl, Oxadiazon, Oxasulfuron, Oxaziclomefone, Oxyfluorfen, Paclobutrazol, Paraquat, Paraquat-dichlorid, Pendimethalin, Pendralin, Penoxsulam, Pentanochlor, Pentoxazone, Perfluidone, Pethoxamid, Phenisopham, Phenmedipham, Phenmedipham-ethyl, Picloram, Picolinafen, Pinoxaden, Piperophos, Pirifenop, Pirifenop-butyl, Pretilachlor, Primisulfuron, Primisulfuron-methyl, Probenazole, Profluazol, Procyazine, Prodiamine, Prifluraline, Profoxydim, Prohexadione, Prohexadione-calcium, Prohydrojasmone, Prometon, Prometryn, Propachlor, Propanil, Propaquizafop, Propazine, Propham, Propisochlor, Propoxycarbazone, Propoxycarbazone-sodium, Propyrisulfuron, Propyzamide, Prosulfalin, Prosulfocarb, Prosulfuron, Prynachlor, Pyraclonil, Pyraflufen, Pyraflufen-ethyl, Pyrasulfotole, Pyrazolynate (Pyrazolate), Pyrazosulfuron, Pyrazosulfuron-ethyl, Pyrazoxyfen, Pyribambenz, Pyribambenz-isopropyl, Pyribambenz-propyl, Pyribenzoxim, Pyributicarb, Pyridafol, Pyridate (C7), Pyriftalid, Pyriminobac, Pyriminobac-methyl, Pyrimisulfan, Pyrithiobac, Pyrithiobac-sodium, Pyroxasulfone, Pyroxsulam, Quinclorac, Quinmerac, Quinoclamine, Quizalofop, Quizalofop-ethyl, Quizalofop-P, Quizalofop-P-ethyl, Quizalofop-P-tefuryl, Rimsulfuron, Saflufenacil, Secbumeton, Sethoxydim, Siduron, Simazine, Simetryn, SN-106279, i.e. Methyl-(2R)-2-({7-[2-chloro-4-(trifluoromethyl)phenoxy]-2-naphthyl}oxy) propanoate, Sulcotrione, Sulfallate (CDEC), Sulfentrazone, Sulfonneturon, Sulfonneturon-methyl, Sulfosate (Glyphosate-trimesium), Sulfosulfuron, SYN-523, SYP-249, i.e. 1-Ethoxy-3-methyl-1-oxobut-3-en-2-yl-5-[2-chloro-4-(trifluoromethyl)phenoxy]-2-nitrobenzoate, SYP-300, i.e. 1-[7-Fluoro-3-oxo-4-(prop-2-in-1-yl)-3,4-dihydro-2H-1,4-benzoxazin-6-yl]-3-propyl-2-thioxoimidazolidin-4,5-dione, Tebutam, Tebuthiuron, Tecnazene, Tefuryltrione, Tembotrione, Tepraloxydim, Terbacil, Terbucarb, Terbuchlor, Terbumeton, Terbuthylazine, Terbutryn, Thenylchlor, Thiafluamide, Thiazafluron, Thiazopyr, Thidiazimin, Thidiazuron, Thiencarbazone, Thiencarbazone-methyl, Thifensulfuron, Thifensulfuron-methyl, Thiobencarb, Tiocarbazil, Topramezone, Tralkoxydim, Triallate, Triasulfuron, Triaziflam, Triazofenamide, Tribenuron, Tribenuron-methyl, Trichloroacetic acid (TCA), Triclopyr, Tridiphane, Trietazine, Trifloxysulfuron, Trifloxysulfuron-sodium, Trifluralin (C8), Triflusulfuron, Triflusulfuron-methyl, Trimeturon, Trinexapac, Trinexapac-ethyl, Tritosulfuron, Tsitodef, Uniconazole, Uniconazole-P, Vernolate, ZJ-0862, i.e. 3,4-Dichloro-N-{2-[(4,6-dimethoxypyrimidin-2-yl)oxy]benzyl}aniline, salts thereof and mixture thereof.

According to a preferred embodiment, the invention relates to a method for reducing spray drift during spray application of a pesticidal formulation that comprises a herbicidal active substance selected among Glyphosate, Glufosinate, Paraquat, 2,4-D, Dicamba, Clethodim, derivatives thereof and/or mixtures thereof. When the herbicidal active substance is a mixture, preferably it is a mixture of Clethodim and Dicamba or a mixture of Dicamba and Glyphosate, or a mixture of Dicamba and Glufosinate.

The pesticidal or crop protection formulations of the method are aqueous diluted formulations that can be sprayed on the fields. For the purposes of this application, the term “diluted” means that the pesticidal or crop protection tank formulations have an active substance(s) concentration of from about 0.001 to about 50 g/l.

The pesticidal or crop protection tank formulations of the method may optionally contain one or more additional ingredients known in the art, such as water conditioners, chelating agents, antioxidants, antifoam agents, fillers, wetting agents, dispersing agents, spreading agents, pH adjusting agents, binding agents, stabilizers, organic solvents, antifreeze agents, penetrants, bioactivators or compatibilizing agents.

Water typically represents at least 90% by weight of the aqueous diluted formulations. The pesticidal or crop protection tank formulations are usually prepared in loco by the farmer or contractor by mixing concentrated pesticidal formulations of active substances (that can be in various forms, for instance neat liquids or powders, granules, aqueous solutions, concentrated suspensions, concentrated emulsions, suspoemulsions or the like), water and the additional ingredients. The here disclosed diluted agrochemical tank formulations do not require special spraying devices and can be applied on the target area using conventional spray equipment for aerial or ground applications, even with drones.

To demonstrate the advantages of the non-aqueous suspension of the present invention, suspensions were prepared with exemplary suspending agents, evaluating the behavior of the suspending agent and the stability of the suspensions thus obtained.

EXAMPLES

Comparative Examples 1c-3c and 7c-9c

Carrier fluid is weighted in a 250 mL glass beaker; the suspending agent is added slowly under magnetic stirring to the carrier fluid. After 10 minutes of stirring the polysaccharide particles to be suspended are weighted and added slowly under mechanical stirring to the viscosified carrier fluid; the mixture is stirred for 5 minutes to achieve an homogeneous suspension.

Comparative Example 4c and Examples 5 and 6

The carrier fluid is weighted in a 250 mL glass beaker; the emulsifier and the polysaccharide are added to the carrier fluid under stirring. Citric acid to pH about 5.5 (of the 1 wt % solution) is added. The suspending agent is added slowly under stirring to the mixture. The mixture is stirred for about 10 minutes to achieve an homogeneous suspension.

Viscosity Measurements

The RV Brookfield® Viscosity of the suspensions is measured following ASTM D 2196.

Stability Test 200 mL of suspension are poured in a glass jar and closed with a cap in order to avoid evaporation of the fluid. The jar is stored in a oven at 54° C. for 14 days. Stability is evaluated as percent separation of the carrier fluid on the top of the suspension with the following formula:

$$\%\ \text{separation} = (\text{height of separated carrier fluid on top} / \text{total height of the suspension}) \cdot 100$$

A suspension is considered stable if the percent separation after 14 days at 54° C. is equal to or less than 5%.

The results of the stability test show that the emulsion polymer according to the invention is suitable to provide stable suspensions, whereas the clay, the polyacrylic acids, the ethylene/propylene/styrene copolymer and the polyvinylpirrolidone tested in the comparative Examples fail to provide stable suspensions.

The compositions of the suspensions (wt %) and tests results are reported in Table 1.

TABLE 1

| EXAMPLES | 1c[1] | 2c[1] | 3c[1] | 4c[1] | 5 | 6 | 7c[1] | 8c[1] | 9c[1] |
|---|---|---|---|---|---|---|---|---|---|
| Carrier Fluid | | | | | | | | | |
| diethylene glycol butyl ether | 75.0 | 70.0 | 75.5 | 76.0 | 71.0 | 40.0 | 75.5 | 75.0 | 74.5 |
| PEG-400 | | | | | | 37.0 | | | |
| water | 5.0 | 5.0 | 5.0 | | | | 5.0 | 5.0 | 5.0 |
| Emulsifier | | | | | | | | | |
| sodium dioctyl sulfosuccinate | 1.0 | 1.0 | 1.0 | 1.0 | 1.0 | | 1.0 | 1.0 | 1.0 |
| ethoxylated tallow amine (20EO) | 3.0 | 3.0 | 3.0 | 3.0 | 3.0 | | 3.0 | | |
| Rolfor TR8L[2] | | | | | | 3.0 | | 3.0 | 3.0 |
| Suspending agent | | | | | | | | | |
| Ethyl acrylate methacrylic acid crosslinked emulsion copolymer[8] | | | | | 9.0 | 9.0 | | | |
| Kraton G1702[3] | 1.0 | | | | | | | | |
| PVP K90[4] | | 6.0 | | | | | | | |
| Acritamer 941[5] | | | 0.5 | | | | | | |
| Acritamer 980[5] | | | | | | | 0.5 | 1.0 | 1.5 |
| Clay[6] | | | | 4.0 | | | | | |
| Water-soluble polymer | | | | | | | | | |
| Guar gum | 15.0 | 15.0 | 15.0 | 15.0 | 15.0 | 10.0 | 15.0 | 15.0 | 15.0 |
| Neutralizing agent | | | | | | | | | |
| Citric acid (50%) | 1.0 | 1.0 | 1.0 | | | | | | |
| Viscosity (mPa*s) | 30 | 40 | 30 | 120 | 180 | 3500 | 30 | 253 | 3400 |
| Stability[7] | N | N | N | N | Y | Y | N | N | N |

[1]comparative
[2]$C_{11-14}$ branched alcohol 8EO (Lamberti S.p.a.)
[3]Ethylene/Propylene/Styrene copolymer (Kraton polymers)
[4]polyvinylpyrrolidone (Ashland)
[5]crosslinked polyacrylic acid (Rita Corp.)
[6]Baragel ® 24 (Elementis Specialties), 10 wt % in diethylene glycol butyl ether
[7]after 14 days at 54° C. Y = Stable; N = Separation.
[8]active matter 37 wt % in water

The invention claimed is:

1. A non-aqueous suspension comprising:
   a) from 20 to 90 wt % (% by weight) of a carrier fluid selected from the group consisting of glycols, polyglycols, glycol ethers, glycol esters, lactate esters, or mixtures thereof;
   b) from 2 to 60 wt % of a water-soluble polymer dispersed in said carrier fluid, wherein said water-soluble polymer is selected among polysaccharides, derivatives of polysaccharides, and mixtures thereof;
   c) from 0.5 to 15 wt % of a suspending agent, wherein said suspending agent is a copolymer obtained by polymerization of:
      I. from 20 to 50% by weight of a monoethylenically unsaturated monomer containing a carboxylic group;
      II. from 40 to 70% by weight of a (meth)acrylic acid ester;
      III. from 0.01 to 1% by weight of a polyethylenically unsaturated monomer; and
      IV. from 0 to 3% by weight of a nonionic acrylic associative monomer, wherein the sum of I and II represents at least 80% by weight of the monomer mixture;
   d) from 1 to 20 wt % of an emulsifier; and
   e) less than 10% by weight of water.

2. The non-aqueous suspension according to claim 1, wherein the water-soluble polymer is selected between guar gum and hydroxypropyl guar.

3. The non-aqueous suspension according to claim 1, wherein the carrier fluid is a glycol ether.

4. The non-aqueous suspension according to claim 3, wherein the carrier fluid is ethylene glycol butyl ether, diethylene glycol butyl ether, triethylene glycol butyl ether or dipropylene glycol methyl ether.

5. The non-aqueous suspension according to claim 4, wherein the carrier fluid is diethylene glycol butyl ether.

6. The non-aqueous suspension according to claim 1, comprising:
   a) from 50 to 80 wt % of carrier fluid;
   b) from 5 to 20 wt % of water-soluble polymer;
   c) from 1 to 10 wt % of suspending agent; and
   d) from 3 to 20 wt % of emulsifier.

7. A method for reducing spray drift during spray application of a cr forming the crop protection tank formulation by tank mixing the non-aqueous suspension according to claim 1; and spraying the crop protection tank formulation on a field.

8. A method of preparing a non-aqueous suspension that comprises less than 10% by weight of water comprising the following steps:
   i. providing from 20 to 90 wt % of a carrier fluid selected from the group consisting of glycols, polyglycols, glycol ethers, glycol esters, lactate esters or mixtures thereof;
   ii. providing from 2 to 60 wt % of a water-soluble polymer which is selected among polysaccharides, derivatives of polysaccharides, and mixtures thereof;
   iii. providing from 1 to 20 wt % of an emulsifier;
   iv. mixing said carrier fluid, water-soluble polymer and emulsifier, in any order and regulate the pH of the resulting mixture, measured at 1 wt % in water, to 4-5 by addition of an acid; and
   v. adding to the obtained mixture from 0.5 to 15 wt % of a suspending agent, wherein said suspending agent is a copolymer obtained by a polymerization of
      I. from 20 to 50% by weight of a monoethylenically unsaturated monomer containing a carboxylic group;
      II. from 40 to 70% by weight of a (meth)acrylic acid ester;
      III. from 0.01 to 1% by weight of a polyethylenically unsaturated monomer; and
      IV. from 0 to 3% by weight of a nonionic acrylic associative monomer, wherein the sum of I and II represents at least 80% by weight of the monomer mixture.

* * * * *